April 13, 1965   W. B. MARTIN   3,178,569
LAMP STRUCTURE
Filed June 9, 1961   5 Sheets-Sheet 1
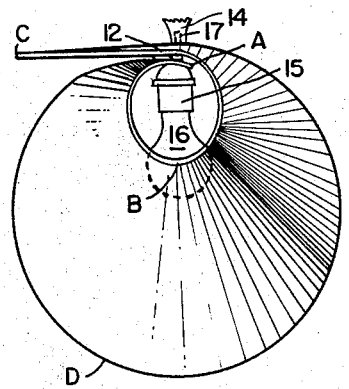
FIG. ID
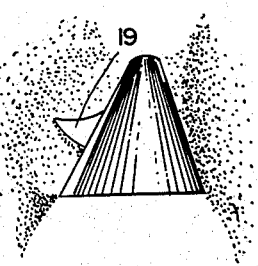
FIG. IE
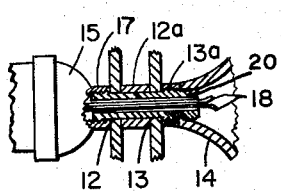
FIG. 6
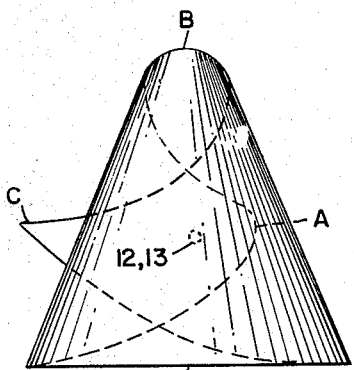
FIG. IC
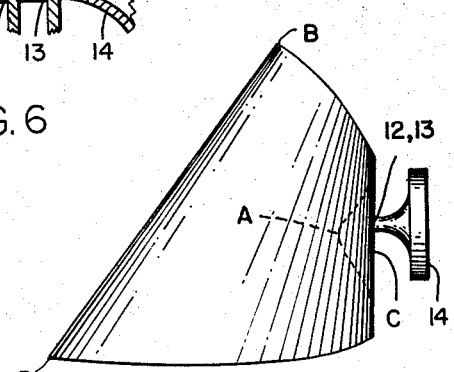
FIG. IB
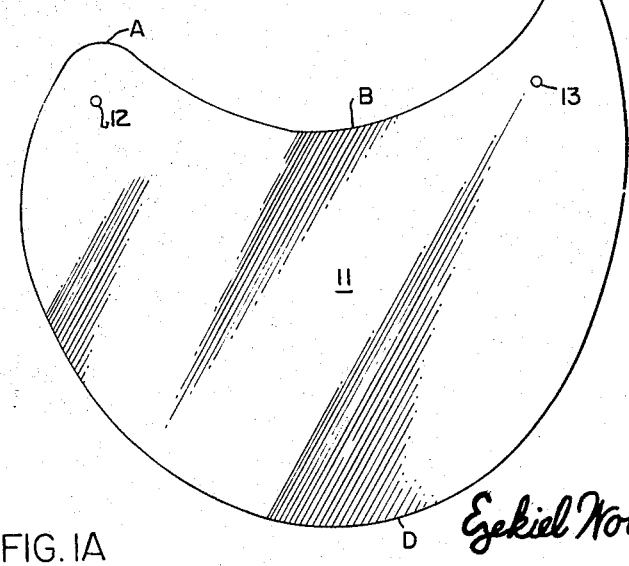
FIG. IA
INVENTOR.
WILLIAM B. MARTIN
BY Ezekiel Wolf, Wolf + Greenfield
ATTORNEYS INVENTOR.
WILLIAM B. MARTIN
BY
Ezekiel Wolf, Wolf & Greenfield
ATTORNEYS April 13, 1965     W. B. MARTIN     3,178,569
LAMP STRUCTURE Filed June 9, 1961     5 Sheets-Sheet 3

INVENTOR.
WILLIAM B. MARTIN
BY
Ezekiel Wolf, Wolf + Greenfield
ATTORNEYS

INVENTOR.
WILLIAM B. MARTIN

April 13, 1965     W. B. MARTIN     3,178,569
LAMP STRUCTURE

Filed June 9, 1961     5 Sheets-Sheet 5

INVENTOR
WILLIAM B. MARTIN
BY
Ezekiel Wolf, Wolf & Greenfield
ATTORNEYS

United States Patent Office 3,178,569
Patented Apr. 13, 1965

3,178,569
LAMP STRUCTURE
William B. Martin, 261 Robbin St., Milton, Mass.
Filed June 9, 1961, Ser. No. 116,118
8 Claims. (Cl. 240—108)

The present invention relates in general to lamps and more particularly concerns a novel lamp that is relatively easy and inexpensive to fabricate, requires relatively little material and few parts, and provides desired useful illumination while at the same time providing additional artistic and decorative effects resulting from the novel form of the lamp.

It is an important object of the invention to provide both adequate illumination and unusual artistic effects with a lamp relatively easy to fabricate, requiring relatively little material, few parts, yet being of sturdy construction.

According to the invention, the lamp comprises a sheet bounded by a perimeter formed by a plurality of contiguous curves. Means such as a bulb socket, are provided for supporting and delivering electrical energy to a light source such as an electric light bulb. Means are also provided for maintaining the sheet surrounding the light source support means with at least two spaced points on the sheet in adjacent overlapping relationship so that a line passes through said two spaced points and the light source support means. Preferably the sheet is formed with an opening embracing each spaced point so that the sheet is held in overlapping relationship by means including a nipple attached to a bulb socket and passing through the openings.

Numerous other features, objects and advantages of the invention will become apparent from the following specification when read in connection with the accompanying drawing in which:

FIGS. 1A, 2A, 3A, 4A and 5A show representative forms of flat sheets suitable for being formed into an element of the lamp according to the invention;

FIGS. 1B, 1C and 1D show different views of a lamp according to the invention comprising the sheet of FIG. 1A;

FIG. 1E shows the novel lamp of FIGS. 1B–1D aimed downward when supported from a wall to illustrate the interesting shadow patterns developed;

FIG. 6 shows a means for maintaining points on the sheet in overlapping adjacent relationship according to the invention.

Figure 2D:
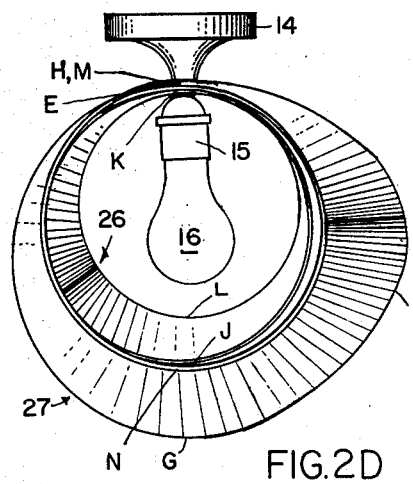
FIGS. 2B, 2C and 2D are different views of an embodiment of the invention incorporating the flat sheet shown in FIG. 2A.

With reference now to the drawing the five figures illustrate respective embodiments of the invention. The A view of each embodiment shows the flat sheet from which the lamp shade is formed. The B, C and D views show side, front and top views, respectively of the embodiment. To avoid obscuring important structural details of the invention, the bulb and socket is shown only in the top view of each embodiment. The E view of each figure shows a front view of the embodiment hanging from a wall with the light bulb illuminated to illustrate the unusual shadow effects produced by the invention through a combination of direct and indirect lighting.

Corresponding points on the perimeter of the sheet in the A view and the different views of the formed lamp are identified by corresponding letters. Corresponding elements throughout the drawing are identified by the same reference symbol.

With specific reference to FIG. 1, FIG. 1A shows a sheet 11 bounded by perimeter ABCDA defined substantially by intersecting arcs ABC and CDA having substantially a common cord joining points A and C. Sheet 11 is formed with openings 12 and 13 in the corners near points A and C, respectively.

Sheet 11 is formed according to the invention as shown in FIGS. 1B–1C so that openings 12 and 13 are in overlapping adjacent relationship with point B above point D. As seen best in FIG. 1D, point C is overlapped behind and to the left of opening 12 while point A is in front of and to the right of opening 13.

Bulb socket 15 supports a bulb 16 and may be of the conventional type having a threaded end cap 17. The threaded recess of end cap 17 receives one end of the threaded hollow nipple 20. The other end of nipple 20 screws into the threaded recess of base 14. Nipple 20 passes through openings 12 and 13 of sheet 11 with spacers 12a and 13a helping to maintain the portions of sheet 11 around these openings in overlapping adjacent relationship. The electrical leads 18 are brought out through the hollow assembly. Thus the sheet, nipple, spacers, socket and base coact to hold the lamp together in the illustrated form, shown in FIG. 6.

A feature of the invention resides in the ease with which the particular form of the lamp may be modified by the user to achieve a variety of light and shadow patterns. By unloosening base 14 the overlapping ends may be relatively rotated about the axis of openings 12 to 13 to change the area of the top and bottom openings and accordingly alter the light and shadow pattern. FIG. 1E is a front view illustrating a typical shadow pattern obtained with the embodiment of FIG. 1 when bulb 16 is illuminated. Note that the lamp provides a combination of direct and indirect lighting, the left flap 19 being indirectly illuminated from reflections of the right inside of the sheet. Preferably, the portions of the surface of sheet 11 which face bulb 16, or inside surface portions, are made reflective, such as by painting it white, while the other surfaces of sheet 11 which face away from bulb 16, or outside surface portions, are painted with a dark flat finish or light pastel finish, such as flat maroon or dark green, to accentuate the light and shadow appearance of the illuminated lamp. Another feature of the lamp is that it may stand horizontally on base 14 on a table adjacent to a wall to provide very pleasing decorative illuminations. Alternatively, it may be suspended from the ceiling from base 14.

With reference now to FIG. 2, there is shown a second embodiment of the invention formed from a strip-like sheet 21 having an opening 23 near the end E of the sheet and another opening 24 near the other end K of the sheet. A third opening 25 is located intermediate the openings 23 and 24. It will be seen from FIGS. 2B and 2C that the portion of sheet 21 bounded by contiguous arcs HJKLM forms the lower loop 26 while the portion bounded by contiguous arcs MNEFGH forms the upper loop 27. FIG. 2D shows that lower loop 26 lies within the cross sectional area of upper loop 27. The base 14 and bulb socket 15 may coact in the same manner as shown in FIG. 6 to keep sheet 21 formed as shown in FIGS. 2B–2D.

Figure 2E:
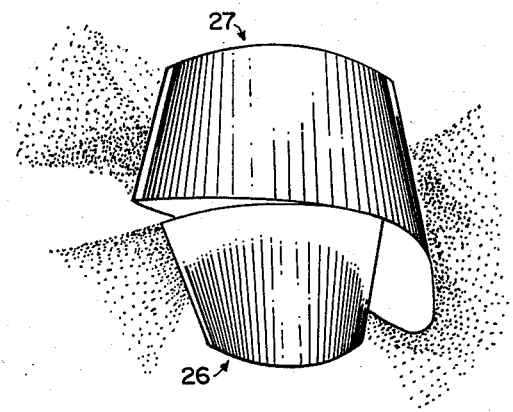
FIG. 2E shows the lamp of FIGS. 2B–2D hanging from a wall and illuminated to illustrate the interesting shadow patterns developed.
Figure 2C:
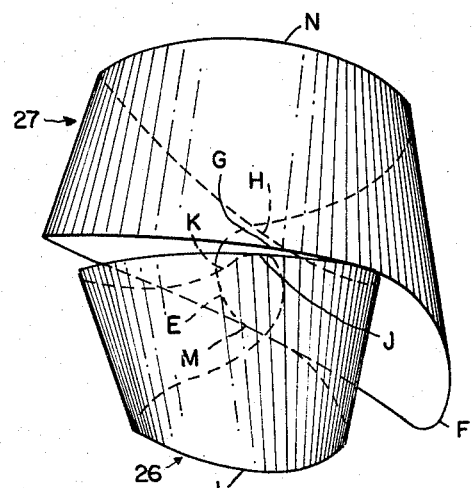
Figure 2B:
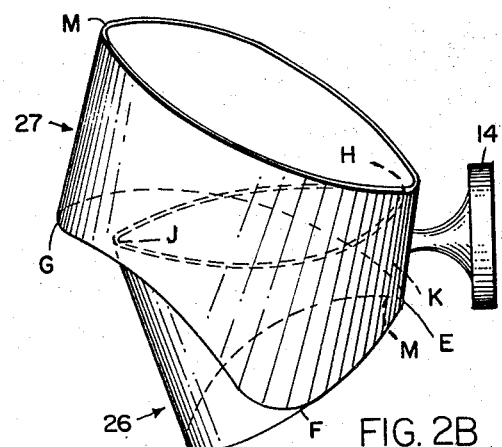
Figure 2A:
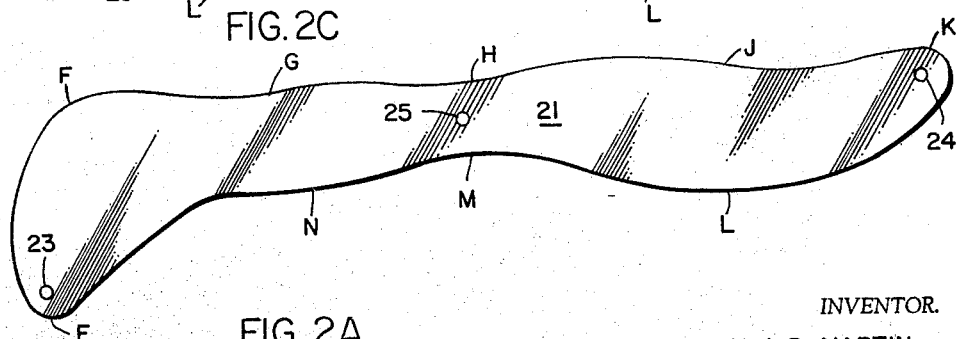

FIG. 2E shows the unusual shadow and light pattern developed when bulb 16 is illuminated in the second exemplary embodiment. Note how a strip of light illuminates the upper portion of loop 26 as a result of reflections from the lower inside portion of upper loop 27.

Referring to FIG. 3, there is shown a third exemplary embodiment of the invention in which a long strip-like sheet 31 is formed with an opening 33 at one end and an opening 34 at the other end with an opening 35 about midway between the ends O and S. It will be observed from FIGS. 3B–3D that the portion of sheet 31 bounded by contiguous curves UVOPQ forms inner loop 36 while the remaining portion bounded by the contiguous curves QRSTU forms outer loop 37. Base 14 and socket 15 may coact to hold sheet 31 in the form illustrated.

Figure 3D:
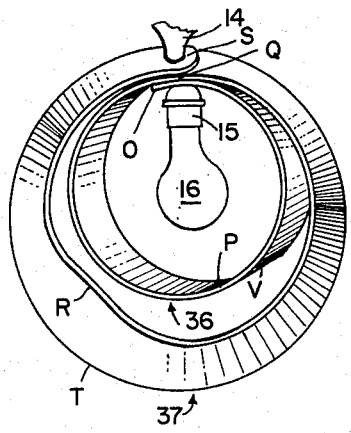
FIGS. 3B–3D show different views of an embodiment according to the invention including the sheet of FIG. 3A.
Figure 3E:
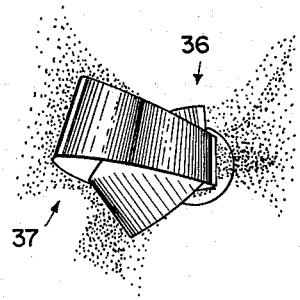
FIG. 3E shows the embodiment of FIGS. 3B–3D hanging from a wall illuminated to show the unsual shadow patterns developed.
Figure 3C:
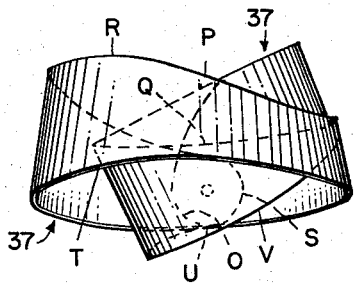
Figure 3B:
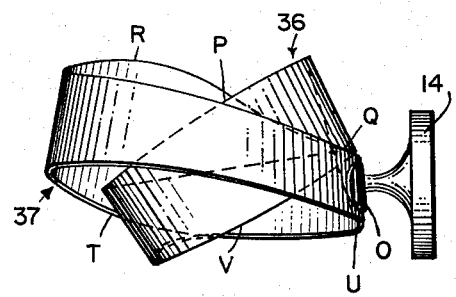
Figure 3A:
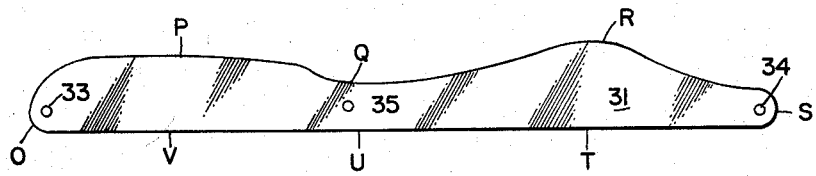

FIG. 3E shows the interesting and unusual light and shadow patterns typically provided when bulb 16 is illuminated.

Referring to FIG. 4, there is shown a fourth embodiment of the invention in which a longitudinal strip 41 is formed with an opening 42 at one end A' and another opening 43 at the other end G' with another intermediate opening 44 closer to opening 43 than to opening 42. It will be seen from FIGS. 4B and 4C that the portion bounded by the contiguous curves E'F'G'H'J' forms lower loop 46 while the portion bounded by the remaining contiguous curves J'K'L'M'A'B'C'D'E' forms upper loop 47. Base 14 may coact with bulb socket 15 to hold sheet 41 in the form shown in FIGS. 4B–4D.

Figure 4D:
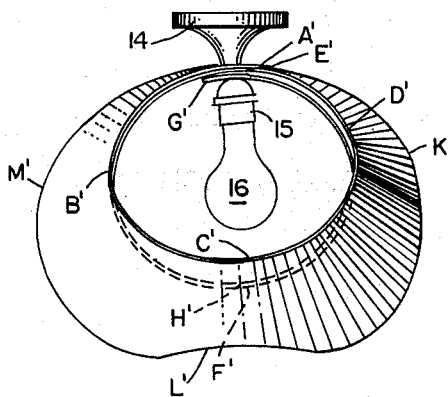
FIGS. 4B, 4C and 4D show an embodiment of the invention formed from the sheet of FIG. 4A.
Figure 4E:
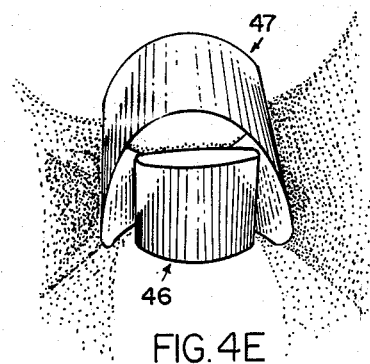
FIG. 4E shows the embodiment of FIGS. 4B–4D illuminated when suspended from a wall to illustrate the interesting shadow patterns developed.
Figure 4C:
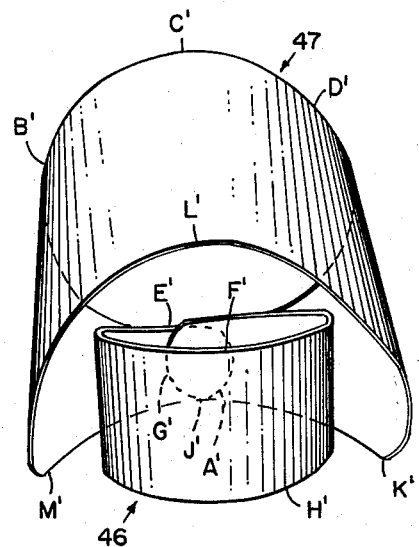
Figure 4B:
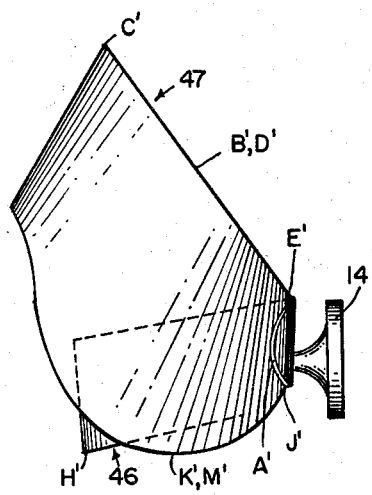
Figure 4A:
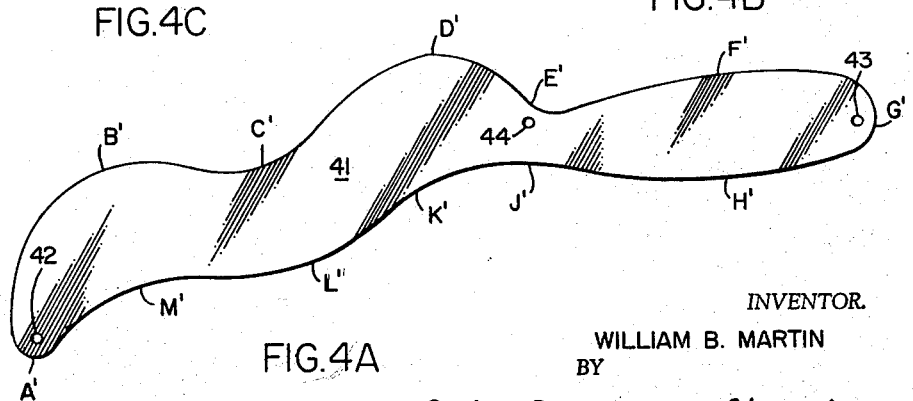
Figure 5D:
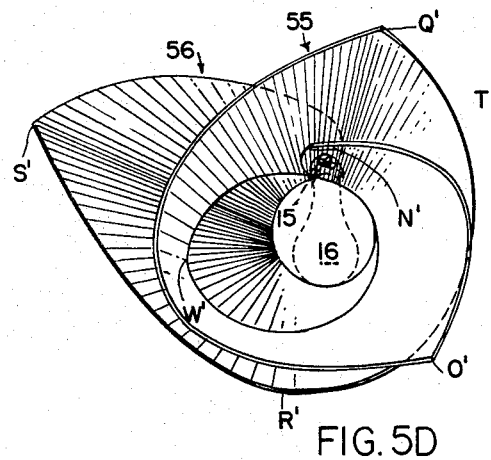
FIGS. 5B, 5C and 5D show different views of a lamp comprising the sheet of FIG. 5A.
Figure 5E:
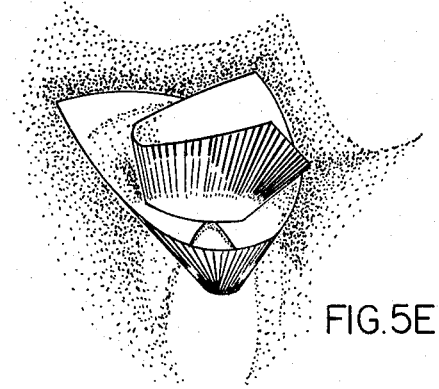
FIG. 5E shows the lamp of FIGS. 5B–5D suspended from a wall to illustrate the novel shadow patterns developed when the lamp is illuminated.
Figure 5C:
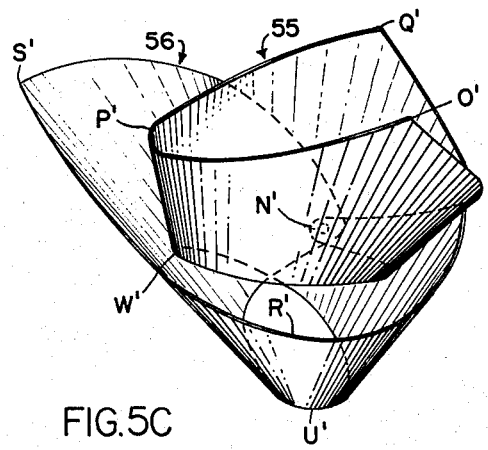
Figure 5B:
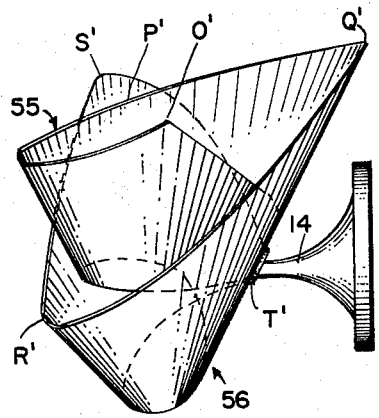
Figure 5A:
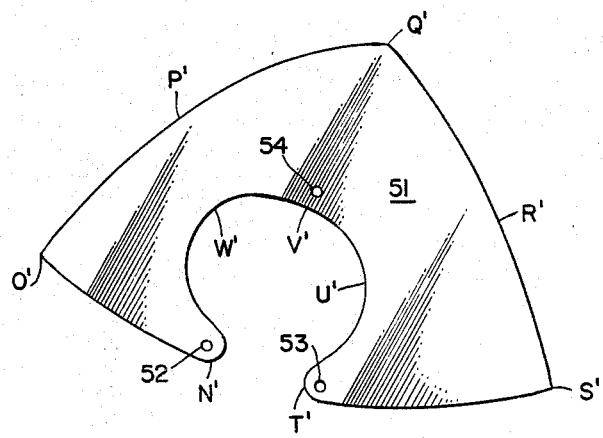

FIG. 4E shows the interesting and unusual light and shadow patterns developed with the fourth embodiment against a wall and bulb 16 illuminated. Note that in this embodiment there is visual symmetry whereas the other embodiments produce visually asymmetrical patterns.

Referring to FIG. 5, there is shown a fifth embodiment of the invention. Sheet 51 of FIG. 5A is formed with an opening 52 at one end N' and an opening 53 at another end T' with a third opening 54' midway between. The portion bounded by the contiguous curves V'W'N'O'P'Q' of sheet 51 forms the inside loop 55 while the remaining portion of sheet 51 bounded by the contiguous curves Q'R'S'T'U'V' forms the outside loop 56. FIG. 5E shows the unusual and interesting shadow patterns developed when bulb 16 is illuminated.

There has been described a novel lamp characterized by useful and decorative illumination achieved with relatively low-cost material relatively easy to fabricate. The described shapes of sheets, light source support means and fastening means are by way of example only for illustrating the best mode now contemplated for practicing the invention and may be of numerous different types within the principles of the invention.

Since numerous modifications of and departures from the specific embodiments described herein may be practiced by those skilled in the art without departing from the inventive concepts, the invention is to be construed as limited only by the spirit and scope of the appended claims.

What is claimed is:

1. A lamp comprising, a volume surrounding sheet bounded by a perimeter formed by a plurality of contiguous curves, said sheet being formed with at least two spaced points thereon, means for supporting and delivering electrical energy to a light source, positioned to maintain open both ends of the volume surrounded by said sheet and means for maintaining said sheet surrounding said volume and said supporting means with said points in adjacent overlapping relationship, a line defined by said points passing through said supporting means, an inside surface portion of said sheet facing said source positioned for reflecting light from said source to an outside surface portion of said sheet that faces away from said source.

2. A lamp in accordance with claim 1 wherein said supporting means is a bulb socket, and said maintaining means comprises a shaft coacting with said bulb socket and surrounding said line.

3. A lamp in accordance with claim 2 wherein said perimeter is formed by two intersecting arcs having substantially a common chord, said points being embraced in openings located in respective ones of the two corners formed by said intersecting arcs.

4. A lamp in accordance with claim 2 wherein said sheet comprises a strip having a length dimension greater than its width dimension, two of said points being near the ends of said strip, a third of said points being substantially midway between the latter two, said maintaining means keeping said sheet with all three of said points in closely adjacent overlapping relationship with said three points defining a common axis.

5. A lamp in accordance with claim 4 wherein one of the lengthwise edges of said strip is substantially straight with all three of said points defining a line generally parallel to said straight lengthwise edge.

6. A lamp in accordance with claim 4 wherein a first portion of said sheet surrounds a first volume of one cross-sectional area, and a second portion of said sheet surrounds a second volume of cross-sectional area less than said one cross-sectional area, said second volume being partially coextensive with said first volume.

7. A lamp in accordance with claim 6 wherein said sheet when flat is bounded by first and second intersecting arcs, and a third arc distorted inward toward the vertex of the angle formed by said first and second arcs.

8. A lamp comprising, a volume surrounding sheet bounded by a perimeter formed by a plurality of contiguous curves, said sheet being formed with at least two spaced points thereon, means for supporting and delivering electrical energy to a light source positioned to maintain open both ends of the volume surrounded by said sheet, and means for maintaining said sheet surrounding said volume and said supporting means with said points in adjacent overlapping relationship, an inside surface portion of said sheet facing said source positioned for reflecting light from said source to an outside surface portion of said sheet that faces away from said source.

References Cited in the file of this patent

UNITED STATES PATENTS

| | | |
|---|---|---|
| 137,034 | Simmons | Mar. 18, 1873 |
| 2,862,321 | James | Dec. 2, 1958 |
| 2,933,223 | Kravig et al | Apr. 19, 1960 |

FOREIGN PATENTS

| | | |
|---|---|---|
| 556,323 | Belgium | Apr. 30, 1957 |
| 846,401 | Great Britain | Aug. 31, 1960 |

OTHER REFERENCES

German application (KL 4b 1/01) 1,028,052, printed Apr. 17, 1958.